(No Model.) 6 Sheets—Sheet 3.
H. STOCKHEIM.
FILTERING APPARATUS.

No. 444,733. Patented Jan. 13, 1891.

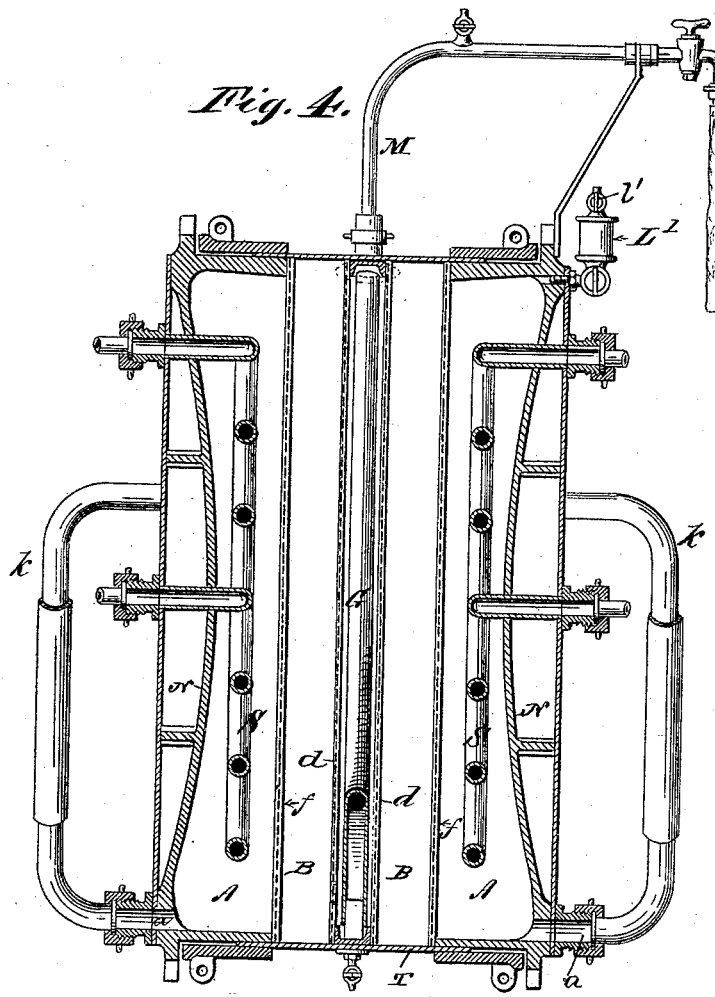

(No Model.) 6 Sheets—Sheet 5.
H. STOCKHEIM.
FILTERING APPARATUS.
No. 444,733. Patented Jan. 13, 1891.
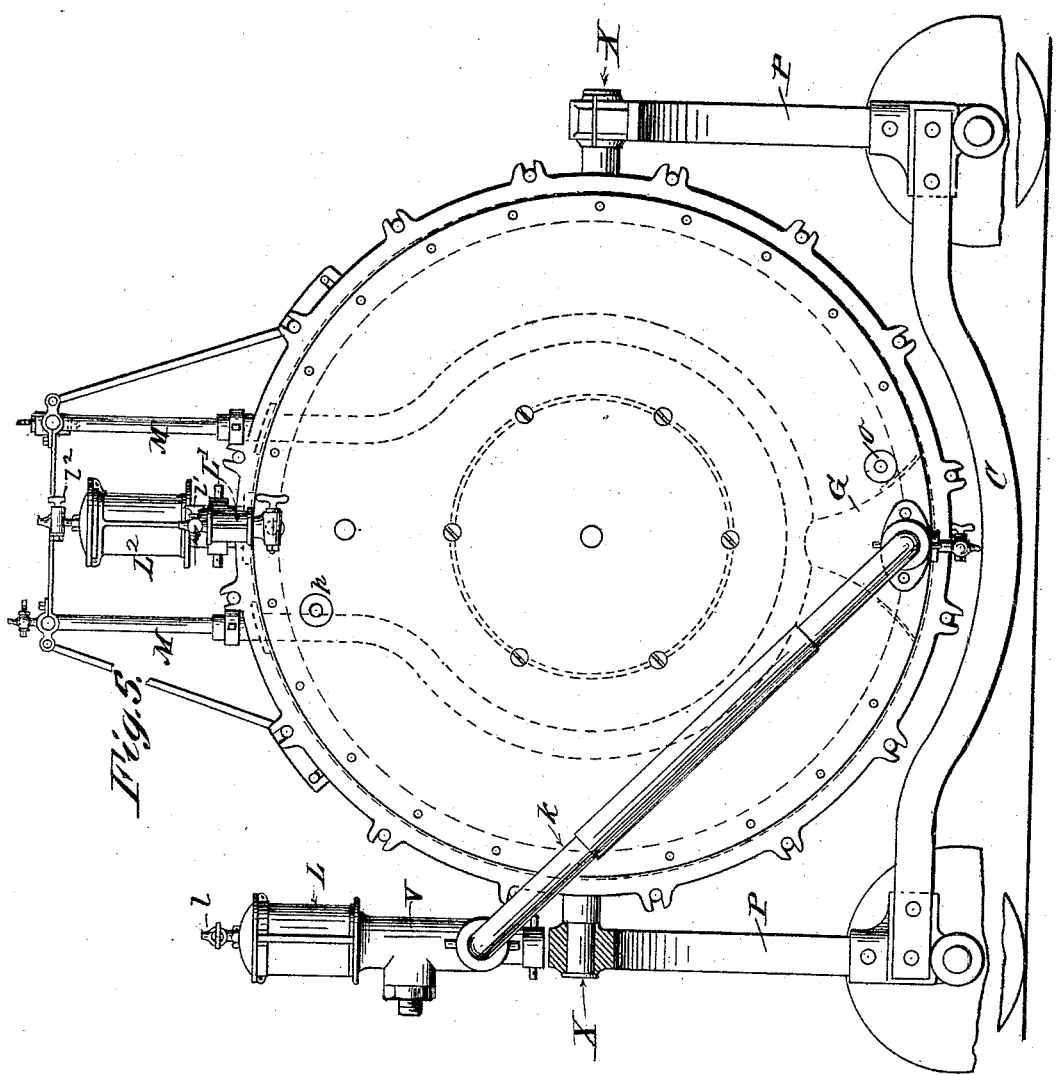

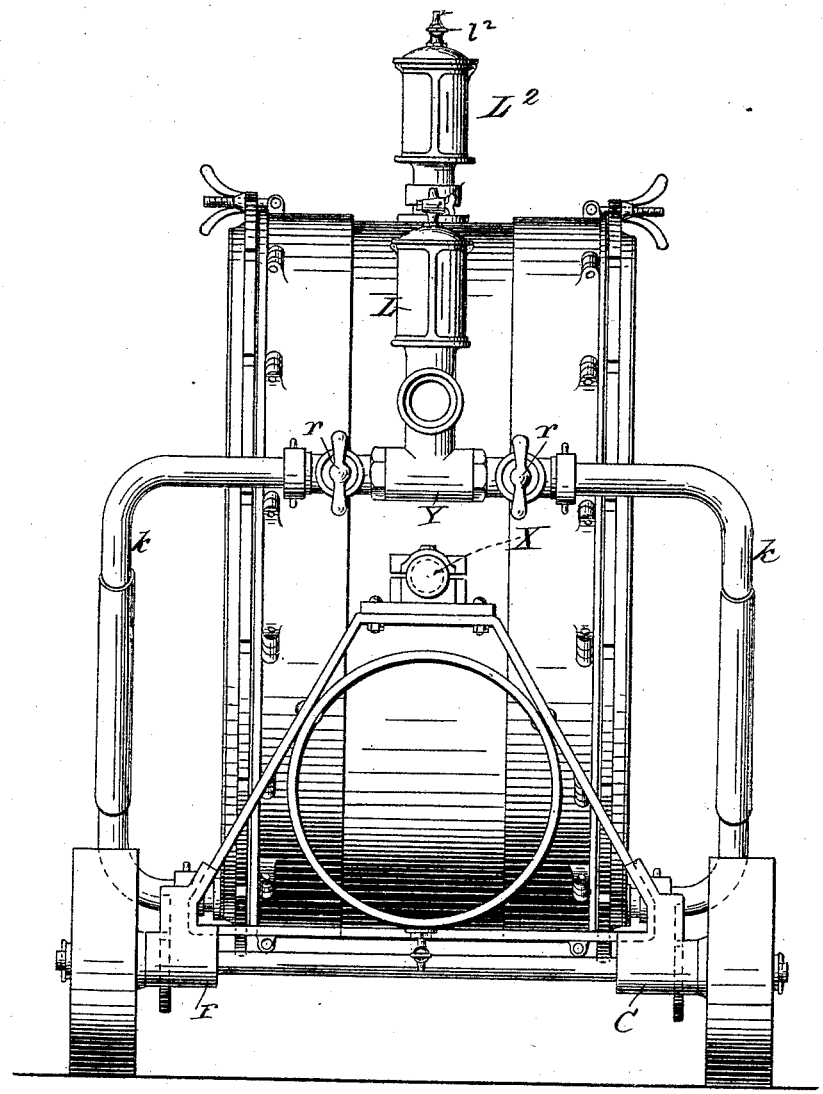

UNITED STATES PATENT OFFICE.

HEINRICH STOCKHEIM, OF MANNHEIM, BADEN, GERMANY, ASSIGNOR TO SIMON UHLMANN AND FREDERICK UHLMANN, BOTH OF NEW YORK, N. Y.

FILTERING APPARATUS.

SPECIFICATION forming part of Letters Patent No. 444,733, dated January 13, 1891.

Application filed March 2, 1887. Serial No. 229,423. (No model.) Patented in France June 28, 1887, No. 181,490.

*To all whom it may concern:*

Be it known that I, HEINRICH STOCKHEIM, a citizen of the German Empire, and a resident of Mannheim, in the Grand Duchy of Baden, Germany, have invented a certain new and useful Filtering Apparatus, (for which Letters Patent of the Republic of France, No. 181,490, were granted to me on June 28, 1887, for the term of fifteen years from February 11, 1887,) of which the following is a specification.

The object of this invention is the filtration of liquids, and especially those—such as malt liquors—which contain mechanical impurities and also gas under pressure. In the filtration of such liquids it is important that the liquid—beer, for example—should be filtered continuously in its passage from the store-vat to the barrels or kegs into which it is drawn for sale without material loss of the carbonic-acid gas contained in the beer and without material foaming in the barrel or keg into which the filtering beer is delivered. Great difficulty has been experienced in breweries in attaining these ends, and I have found by experience that variations of the supply of beer to the filter and variations in the speed with which the filtered liquor is discharged into the kegs or barrels produce variations in the pressure upon the beer in its passage through the filter, which permit more or less gas to separate from the liquid, the practical result of which is that the liquid begins to foam and is discharged in a foaming condition into the keg or barrel, thereby preventing it from being filled with facility, or that the gas permeates the filtering material, thereby affecting to a greater or less extent its efficiency as a separator of mechanical impurities, or that both these results ensue.

My invention is designed to obviate these difficulties; and it consists of certain combinations of mechanical devices which are set forth in detail in the claims at the close of this specification, and some of which may be used without the others, as found expedient. In order that these combinations may be fully understood, I have represented in the accompanying drawings and will proceed to describe several forms of filtering apparatus which embody more or less parts of my invention and which show that a filtering apparatus may be greatly changed in appearance without ceasing to embody material parts of my invention.

Figure 1:
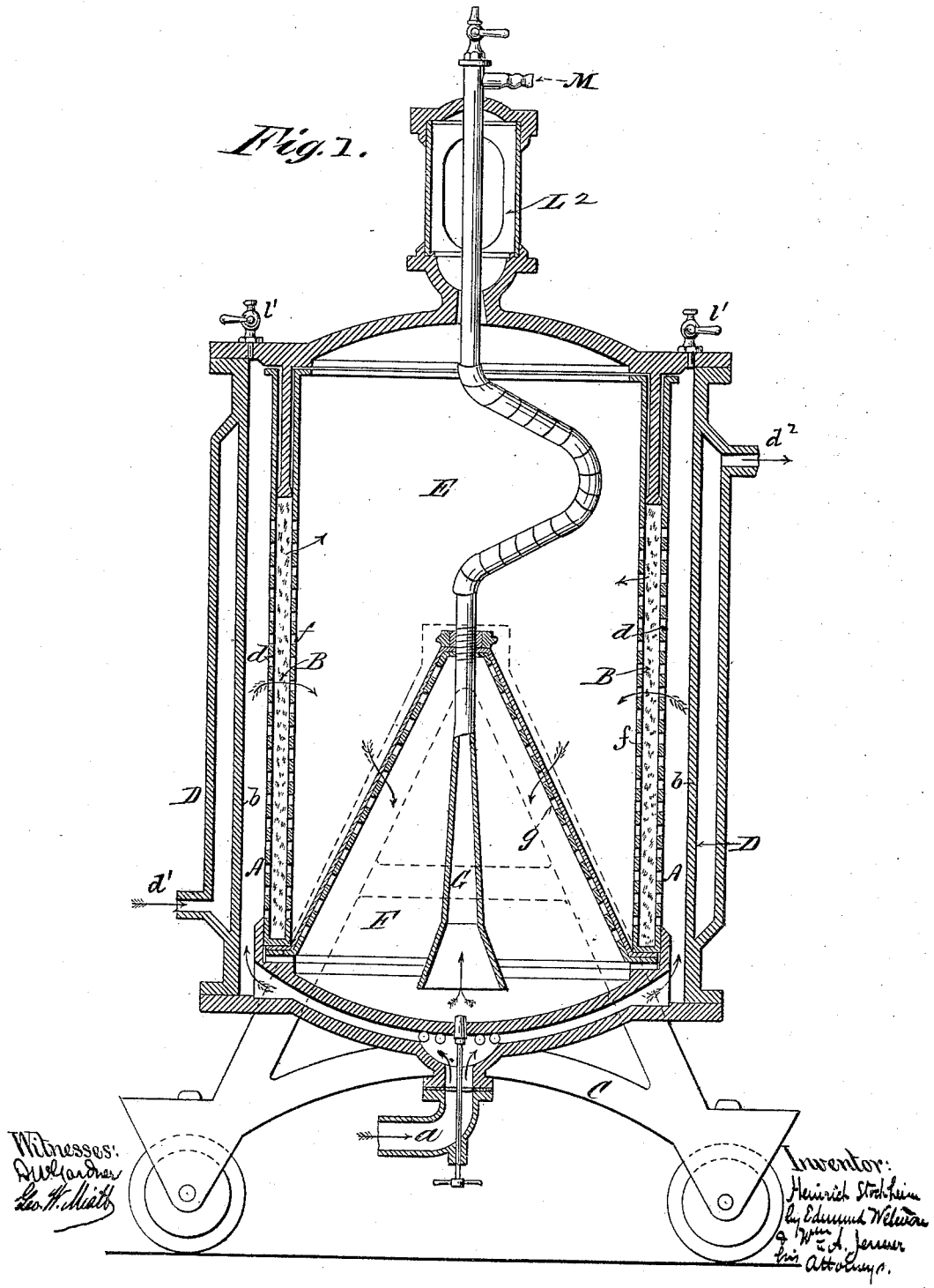
Figure 2:
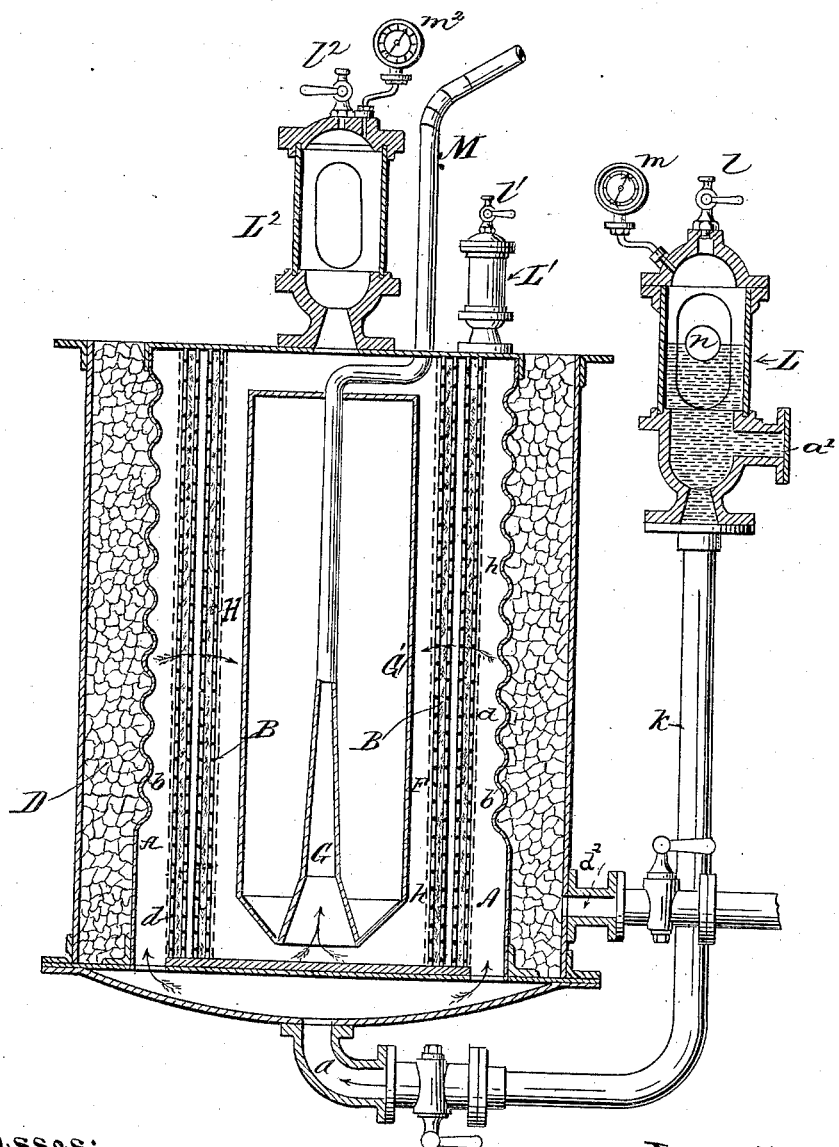
Figure 3:
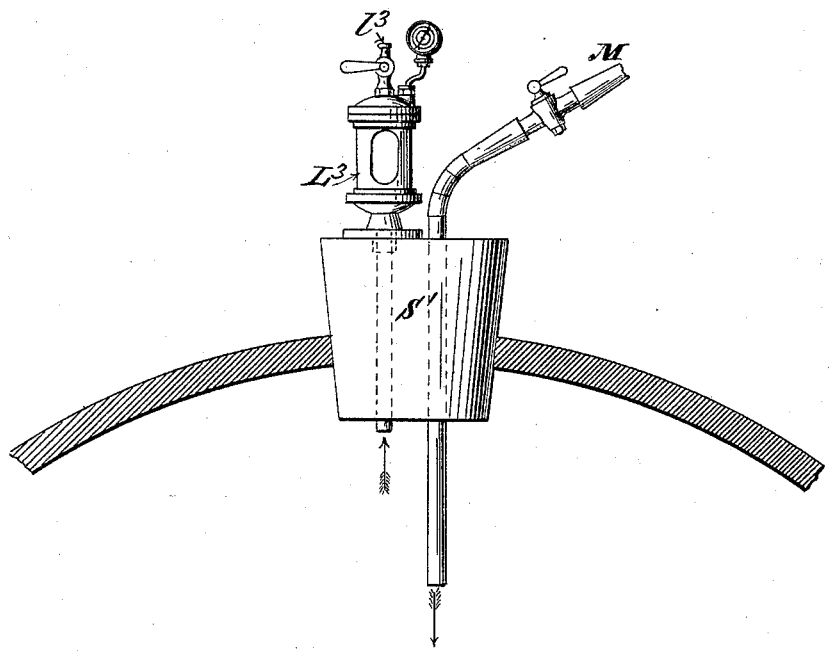

Figures 1 and 2 of the said drawings are vertical axial sections of two of the said forms of filtering apparatus. Fig. 3 is an elevation of a bung provided with means for filling a cask with the filtered liquid under pressure, a portion of the cask being shown in section. Figs. 4, 5, and 6 represent, respectively, a vertical axial section, an end elevation, and a side elevation of another form of the said filtering apparatus embodying all the parts of my said invention.

Filtering apparatuses constructed according to my invention may be of various forms and may be stationary or may be portable. In the last case the filtering apparatus is mounted on a frame or carriage, by which it may be readily moved about, such a carriage being represented at C, Figs. 5 and 6, and being preferably mounted upon wheels, as represented in those figures.

In the apparatuses represented at Figs. 1 and 2 the filtering apparatus is of cylindrical form, with the axis of the cylinder upright, and in each of these apparatuses the liquid to be filtered is conducted to the apparatus through a nozzle $a$ and is delivered into the bottom of the entry or receiving chamber A, from which it passes through the filtering material. The filtering material B, which may be cloth or other suitable material, is confined between two perforated walls $d\,f$, which in practice are to be preferably made of sheet-copper perforated and covered with wire-gauze. These walls constitute the filter-support. The filtered liquor which passes through the filtering material is received in the discharge-chamber E, from which it is permitted to escape through a pipe M, which communicates, preferably, with the bottom of that chamber. In order that the liquid may, if deemed expedient, be filtered a second time, the discharge-chamber of the apparatus of Fig. 1 is fitted with a perforated conical wall $g$, which constitutes a filter-support and which is covered with flannel or other filtering-cloth, and the discharge-pipe M is connected with the space F within the said perforated conical wall by means of the pipe G, so that the filtered liquid is compelled to traverse both masses of filtering material before it escapes from the filtering apparatus.

In the form of apparatus represented at Fig. 2 the perforated cylindrical walls which constitute the filter-support are duplicated and are separated by a space H, so that the liquid may be subjected to a duplex filtration in its passage from the entry-chamber A to the discharge-chamber F, and the innermost and outermost of said cylindrical perforated walls are covered with flannel or the like, as indicated at $h$. The filtered liquid is permitted to pass from the discharge-chamber through the pipe M, which is connected, preferably, with the bottom of the discharge-chamber by means of the internal pipe G. In this apparatus the interior of the discharge-chamber is partially filled by means of a vessel G', which, however, constitutes no part of my invention.

The filtering apparatus represented at Figs. 4, 5, and 6 has the form of a short cylinder or drum with its axis horizontal. In this case the perforated walls $d\ f$, which confine the filtering material and form the filter-support, are of disk form, and, as in the preceding cases, each filter-support separates the entry-chamber A from the discharge-chamber F. The delivery of the filtered liquid from the discharge-chamber is effected through one or both of the pipes M, which are preferably connected with the bottom of the discharge-chamber by an internal pipe G. In this apparatus both of the sides or heads are removable, they being connected with the cylindrical body by means of bolts with fly-nuts, Fig. 6, so that either head of the apparatus may be readily removed in order that access may be had to the filtering material. In order that the removal and replacement of the filtering material may be facilitated, the body of the filtering apparatus is combined with its carrying-frame by means of trunnions X, so that the filtering apparatus may be tilted to an inclined or horizontal position, as found most convenient for work upon the filtering material. This form of filtering apparatus is advantageous for use in store-cellars, because it occupies but a small space edgewise, and therefore may be readily set in the narrow passage-ways between storage-casks. In this form of apparatus it will be found convenient to have the diaphragms $d\ f$ loosely inserted in the outer casing T, the filtering material being held between them in the spaces B. After tilting the filter-body to an appropriate position one of the diaphragms $d$ is inserted. The filtering material is then introduced and spread over the surface of the diaphragm. The outer diaphragm is then inserted in its space, and, finally, the cover N is applied and secured in place, and, as shown in Fig. 4, the said cover can conveniently be constructed so that when thus applied it will bear against and hold the diaphragms in position. The position of the apparatus can then be reversed and the opposite side of the filter can be similarly prepared.

Beer is generally stored in storage tanks or casks in cellars, which are artificially cooled, and it should be filtered at or about the temperature at which it is stored to prevent the liberation of gas from a rise in the temperature. If the filter which is used be placed in the store-cellar, the cool temperature is maintained during filtration without artificial means; but if the filter be placed outside of the store-cellar it is expedient that means should be provided to keep the beer at its cool temperature during filtration. In order that this may be readily effected, the filters represented in the accompanying drawings are provided with a jacket or jackets which inclose the entry-chamber, the discharge-chamber, and the filtering material, and in which ice may be placed, or through which a cold liquid—such as brine—may be circulated.

In the form of filter represented at Fig. 1 the jacket D is fitted to have a cold liquid—such as brine—circulated through it, the liquid being supplied to the jacket by means of a hose or pipe applied to the entry-nozzle $d'$ and being permitted to escape through a pipe applied to the exit-nozzle $d^2$.

In the form of filtering apparatus represented at Fig. 2 the jacket D is open at its upper end, so that ice may be introduced into it, the inner wall $b$ of the jacket being corrugated, if preferred, and in this case the water from the melting ice is permitted to drain off through an exit-nozzle $d^2$, to which a stop-cock or valve may be applied to control the discharge.

In the form of apparatus shown in Figs. 4, 5, and 6 the heads or covers N are jacketed, the cooling agent entering the jacket at $o$ and leaving it at $p$, Fig. 5. As a substitute for a jacket, a coil of pipe may be introduced into the entry-chamber of the filter, as shown at S, Fig. 4, and a cold liquid may be circulated through this coil for the purpose of keeping the beer at a low temperature during filtration, or the jacket and the coil may both be combined in the same filtering apparatus, as in Fig. 4.

In order that the air in the filtering apparatus may be permitted to escape when the latter is first charged with beer and that such gas as may be liberated from the beer in the apparatus may be permitted to escape during filtration, I combine each of the chambers of the filtering apparatus with a vent-cock connected with the highest part of the chamber or pipe to which the cock appertains. In the case of the filtering apparatus represented at Fig. 1 there are two vent-cocks for the entry-chamber, which are represented at $l'$. In the apparatus represented at Fig. 2 the vent-cock of the entry-chamber is represented at $l'$. In the apparatus represented in Figs. 4, 5, and 6 each of the two entry-chambers is provided with a vent-cock $l'$. The discharge-chamber of the filtering apparatus has also a vent-cock combined with it, the vent-cocks of the apparatuses represented at Figs. 1 and 2 being indicated at $l^2$, although the vent-cock $l^2$ in Fig. 1 is not shown, owing to the plane of section in this figure, said cock in practice being located on top of trap $L^2$, substantially as is the like cock $l^2$ on the trap $L^2$ of the filter shown in Fig. 2, and the vent-cock of the apparatus represented at Figs. 5 and 6 being shown at $l^2$ in those figures. In order that such gas as may separate from the beer in its passage from the store-cask to the filtering apparatus may escape without entering the filtering apparatus, the supply-pipe $k$ of the apparatus has a vent-cock $l$ combined with it. When the vent-cock is combined directly with the chamber or pipe to which it appertains, as represented at $l'$, Fig. 1, the vent-cock must be operated frequently to prevent the possible accumulation of gas in the chamber or pipe to which it appertains. In order that this frequent operation of the vent-cocks may be dispensed with and that the attendant may be relieved of incessant attention to them, I combine the vent-cock with the chamber or pipe to which it appertains through the intervention of a vessel in which the gas may be caught and permitted to accumulate without affecting the operation of the filter, thereby obviating any difficulty that might accrue from the accumulation of gas in the apparatus itself. Thus in the apparatus represented at Fig. 2 the vent-cock $l'$ of the entry-chamber A is combined with that chamber through the intervention of the gas-trap $L'$, which, being connected with the highest part of the apparatus, receives any gas that may be liberated from the beer in the entry-chamber, and thus prevents it from permeating the filtering material. The corresponding gas-traps for the entry-chambers of the apparatus represented in Figs. 4, 5, and 6 are shown at $L'$, there being one of these gas-traps for each of the two entry-chambers of this apparatus. The gas-traps for the discharge-chambers of the apparatuses represented at Figs. 1 and 2 are shown at $L^2$ in each figure, and the gas-traps for the discharge-chamber of the filtering apparatus represented in Figs. 4, 5, and 6 are designated by the same letter $L^2$, the gas-trap in each instance communicating with the highest part of the chamber. I also find it expedient to combine the vent-cock $l$ of the supply-pipe $k$ with a gas-trap, as represented at L, Figs. 2, 5, and 6.

In order that the accumulation of gas in the gas-traps may be detected, each gas-trap has either its body made of glass or has glass panels inserted in its side, or the gas-trap, if made of metal, has a glass water-gage of the usual construction connected with it. A gas-trap of either of these constructions I denominate a "lantern" gas-trap. When the body of the gas-trap is made of glass, it is expedient that it should be cylindrical, as represented at $L'$, Figs. 2, 5, and 6, and, if deemed expedient, the glass body may be protected by an external metallic shield having openings in it. If the operator wishes to know the pressure under which the liquid is kept during filtration, a manometer or pressure-gage is connected with one or more of the gas-traps, as shown at $m$ and $m^2$, Fig. 2.

In preparing either of the above filtering apparatuses for use the joints between the filtering material and the sides of the apparatus and the joints between the removable head or heads of the filtering apparatus and the body thereof should be made tight by means of gaskets of rubber. The filtering apparatus is connected with the store-cask by means of a pipe or hose connecting with the supply-pipe, which in turn connects with the bottom of the entry-chamber of the filtering apparatus, and the discharge-chamber of the filtering apparatus has a pipe or hose fitted to it to conduct the filtered beer to the keg or barrel, this pipe or hose being fitted with a stop-cock, by which the delivery of beer may be controlled. When the apparatus is first put to work, all the vent-cocks are closed, and also the stop-cock in the delivery-pipe.

As the beer enters the lowest part of the entry chamber or chambers under the pressure that exists in the store-cask, it drives the air in the apparatus in an upward direction, so that when the vent-cocks of the filtering apparatus are opened all the air in it may be permitted to escape and the apparatus becomes filled with beer. When this takes place, the vent-cocks are closed and the filling of the kegs or barrels is commenced, the beer which passes from the entry-chamber of the apparatus being efficiently and continuously filtered under pressure during its passage through the apparatus. If any gas is liberated from the beer, it is collected in the gas-traps, from which it is permitted to escape at intervals by the respective vent-cocks without passing through the filtering material and affecting the filtering operation and without entering the discharge-pipe, and consequently without producing foam at the discharge in the keg or barrel. The lantern construction of the gas-traps permits any liberated gas to be detected and allowed to escape from the trap in which it is caught before accumulating to such an extent as to wholly fill the trap, so that the attendant has complete control of the apparatus, and by examining the traps from time to time may keep the filtering-chambers wholly filled with beer. The gas-trap and vent-cock on the supply-pipe furnish efficient means of trapping and permitting the escape of such gas as may be liberated from the beer in the supply-pipe connecting with the store-cask, so that such gas cannot enter the filtering apparatus, and when this gas-trap is of lantern construction the accumulation can be detected without frequently operating the vent-cock for that purpose. Means are also provided for exerting and maintaining a back-pressure on the beer in the filter in order to aid in keeping the filter full of beer during the filtering operation, this result being attained in the present instance by elevating the discharge-pipe above the top of the filter and its lanterns, as well as by making the discharge hose or pipe of diminished capacity as compared with the supply-pipe, as indicated in Figs. 1, 2, 4, and 5.

In order that the entrance of gas to the apparatus from the supply-pipe may be prevented in case the attendant should carelessly omit to open the vent-cock $l$ before the gas-trap L becomes filled with gas, I fit the gas-trap with a float-valve $n$, which in such case will drop in the gas-trap and close the exit-passage thereof, thus automatically stopping the supply of beer to the apparatus until the gas is permitted to escape by the vent-cock.

In order that beer may be barreled under pressure, the pipe M, Fig. 3, through which the beer is conducted to the barrel, is passed through a bung S′, which may be fitted tightly into the bung-hole of the barrel. A vent-cock $l^3$ is combined with the bung through the intervention of a gas-trap $L^3$, and a manometer or pressure-gage is connected with the gas-trap, so that the attendant can observe the pressure within the barrel and permit the air or gas to escape only at a sufficient rate to permit the barrel to be filled with beer. When this venting-pressure bung is used, the beer entering the barrel may be kept under nearly the same pressure that it is subjected to in the filtering apparatus, and consequently there is then but a slight liberation of gas from it. When the barrel is filled, which may be ascertained by the rise of the beer in the lantern gas-trap on the bung, the stop-cock in the supply-pipe M is closed, the venting pressure-bung S′ is quickly removed, and a solid bung is driven into the bung-hole of the barrel, the time required for shifting the bungs being so short that but little gas escapes from the barrel and only a small portion of beer is lost by foaming in the barrel.

The filtering material employed in the above-described apparatus may be of any of the known kinds for such purposes. If it be of cloth, then only one perforated wall is required as the filter-support, as represented at $g$, Fig. 2, and in such case a single perforated wall is the equivalent of two; but if the filtering material be granular, fibrous, or pulverulent, two filtering-walls are required to constitute the filter-support, as previously described.

I claim as my invention—

1. The combination, substantially as before set forth, of the entry-chamber of the filtering apparatus and the filter-support and filtering material with a gas-trap and a vent-cock therefor connected with the said entry-chamber.

2. The combination, substantially as before set forth, of the entry-chamber of the filtering apparatus and the filter-support and filtering material with a gas-trap of lantern construction connected with said entry-chamber, and a vent-cock for the discharge of gas from said gas-trap.

3. The combination, substantially as before set forth, of the entry-chamber of the filtering apparatus, the filter-support and filtering material, and the discharge-chamber of the filtering apparatus with a gas-trap and a vent-cock connected with the said discharge-chamber, whereby the liberated gas may be trapped and permitted to escape.

4. The combination, substantially as before set forth, of the entry-chamber of the filtering apparatus, the filter-support and filtering material, and the discharge-chamber with a gas-trap of lantern construction connected with the discharge-chamber, and a vent-cock for the discharge of the accumulated gas therefrom.

5. The combination, substantially as before set forth, with the entry-chamber of the filtering apparatus, the filter-support and filtering material, and the discharge-chamber, of a supply-pipe for said entry-chamber, a gas-trap connected with the said supply-pipe, and a vent-cock for the discharge of gas therefrom.

6. The combination, substantially as before set forth, with the entry-chamber of the filtering apparatus, the filter-support and filtering material, and the discharge-chamber, of a supply-pipe for the said entry-chamber, a gas-trap of lantern construction connected with the said supply-pipe, and a vent-cock for the discharge of gas therefrom.

7. The combination, substantially as before set forth, of the entry-chamber of the filtering apparatus, the supply-pipe therefor, the filter-support and filtering material, and the discharge-chamber with a gas-trap connected with the said supply-pipe, and a float-valve fitted to close the passage to the said entry-chamber.

8. The combination, with the entry and discharge-chambers, of a supply-pipe leading into the lower part of the entry-chamber, a discharge-pipe leading from the lower part of the discharge-chamber, gas-traps connected with the upper portions of said chambers, respectively, and vent-cocks for the escape of gas collected by said traps, substantially as hereinbefore set forth.

9. In apparatus for filtering beer and the like, the combination, with the entry and discharge chambers, of traps connected with said chambers, respectively, to trap and collect any liberated gases, and vent-cocks for the escape of said liberated gases, substantially as and for the purposes hereinbefore set forth.

10. In beer-filtering apparatus, the combination, with the inlet and discharge chambers and the filter-support and filtering material interposed between said chambers, of a valve or cock controlled vent located on the discharge side of the filtering material and communicating with the discharge-chamber, so that air and gas separated or separating from the beer may be discharged from the beer after its passage through the filtering material, substantially as and for the purposes hereinbefore set forth.

11. In beer-filtering apparatus, the combination of inlet and discharge chambers, the filter-support and filtering material interposed between said chambers, inlet and discharge pipes for said chambers, and valve or cock controlled vents on each side of the filtering material, these elements being organized and arranged together for joint operation substantially in the manner hereinbefore set forth, so that air and gas separated or separating from the beer may be discharged from the beer during the filtering operation both before and after its passage through the filtering material.

12. In beer-filtering apparatus, the combination of the inlet and discharge chambers of the filter, the filter-support and filtering material interposed between said chambers, valve or cock controlled vents located on each side of the filtering material, whereby air and gas may be discharged from the beer during the filtering operation both before and after its passage through the filtering material, and means, substantially as described, for exerting and maintaining a back-pressure upon the beer in the filter, substantially as and for the purposes hereinbefore set forth.

In testimony whereof I affix my signature in presence of two witnesses.

HEINRICH STOCKHEIM.

Witnesses:
  PAUL BOECK,
  B. ROI.